United States Patent [19]

En

[11] 3,882,457

[45] May 6, 1975

[54] BURST ERROR CORRECTION CODE

[75] Inventor: John En, Palatine, Ill.

[73] Assignee: Motorola, Inc., Chicago, Ill.

[22] Filed: Jan. 30, 1974

[21] Appl. No.: 438,138

[52] U.S. Cl. .......................................... 340/146.1 AQ
[51] Int. Cl. ............................................. G06f 11/12
[58] Field of Search ......... 340/146.1 AQ, 146.1 AX

[56] References Cited

UNITED STATES PATENTS

| | | | |
|---|---|---|---|
| 2,956,124 | 10/1960 | Habelbarger | 340/146.1 AQ |
| 3,227,999 | 1/1966 | Hagelbarger | 340/146.1 AQ |
| 3,469,236 | 9/1969 | Gallager | 340/146.1 AQ |
| 3,508,197 | 4/1970 | Tong | 340/146.1 AQ |
| 3,571,795 | 3/1971 | Tong | 340/146.1 AQ |
| 3,593,282 | 7/1971 | Tong | 340/146.1 AQ |
| 3,605,090 | 9/1971 | Burton | 340/146.1 AQ |
| 3,665,396 | 5/1972 | Forney, Jr. | 340/146.1 AQ |

OTHER PUBLICATIONS

Peterson & Weldon, Error–Correcting Codes, Second Edition, The MIT Press, Cambridge, Mass., pp. 427–448.

*Primary Examiner*—Charles E. Atkinson
*Attorney, Agent, or Firm*—Eugene A. Parsons; Vincent J. Rauner

[57] ABSTRACT

A one half rate burst error correcting encoding and decoding system capable of correcting a burst of errors having any arbitrary length B bits long provided that said burst is followed by at least 3B correct bits including an encoder having an information register having B + 1 stages, a parity bit register having 2B + 1 stages, means for combining the contents of the first and last stages of the information register and applying the result to the input of the parity register, and means for alternately applying the outputs of the information and parity registers to a transmission medium. The decoder comprises an information register having at least B + 1 stages, a syndrome register having B + 1 stages, and means for correcting the information bits in accordance with the contents of the first and last stages of the syndrome register.

15 Claims, 7 Drawing Figures

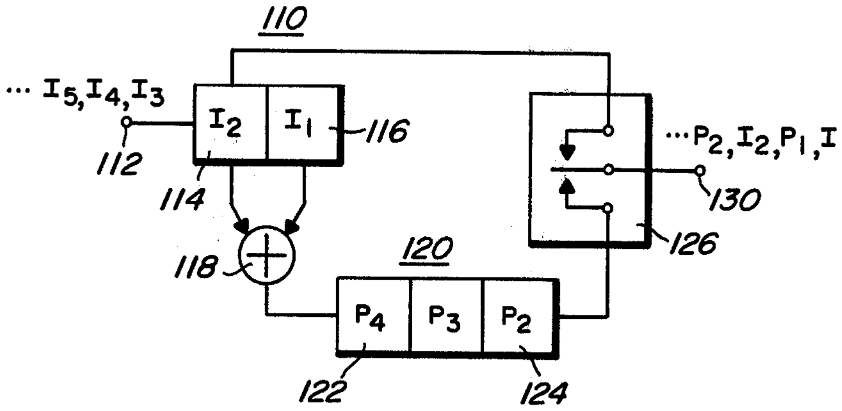
FIG. 3
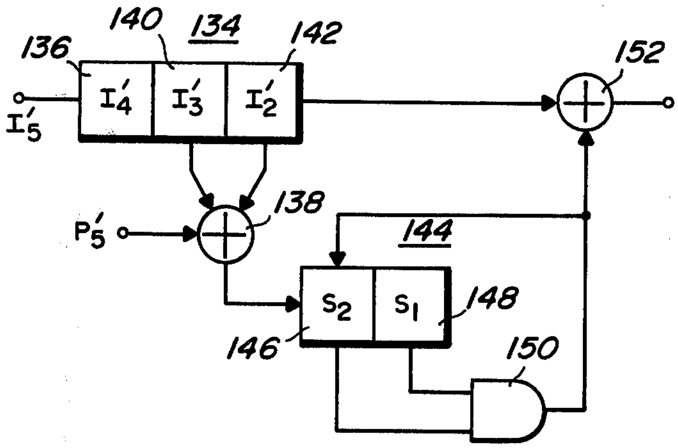
ENCODER EQUATIONS
(1) $P_4 = I_1 \oplus I_2$
(2) $P_5 = I_2 \oplus I_3$
FIG. 5
FIG. 4
GENERAL EQUATIONS
(7) $P_{3B+j} = I_j \oplus I_{B+j}$
(8) $P_{4B+j} = I_{B+j} \oplus I_{2B+j}$
(9) $I'_j \oplus I'_{B+j} \oplus P'_{3B+j} = S_j$
(10) $I'_{B+j} \oplus I'_{2B+j} \oplus P'_{4B+j} = S_{B+j}$
WHERE $j = 0,1,2,3 \cdots$
FIG. 7
DECODER EQUATIONS
(3) $I'_1 \oplus I'_2 \oplus P'_4 = S_1$
(4) $I'_2 \oplus I'_3 \oplus P'_5 = S_2$
(5) $I'_1 \oplus I'_2 \oplus I_1 \oplus I_2 = S_1$
(6) $I'_2 \oplus I'_3 \oplus I_2 \oplus I_3 = S_2$
FIG. 6

BURST ERROR CORRECTION CODE

BACKGROUND

This invention relates generally to error correcting coding systems, and more particularly to a one half rate error correcting coding system capable of correcting a one bit random error out of every four bits and bursts of errors up to B bits long, where B is any positive integer, provided that the burst of errors is followed by at least 3B error free bits.

Several one half rate burst error correcting systems are known. One such system is described in U.S. Pat. No. 3,469,236 issued Sept. 23, 1969 to R. G. Gallager. Another such one half rate burst error correcting system is commonly known as the Kohlenburg code.

Whereas these techniques provide a way to correct burst errors, the coding system according to the invention provides a simplified system that can correct more random errors and burst errors than the codes of the prior art, and has reached the theoretical limit of error correcting capability.

SUMMARY

It is an object of the present invention to provide an improved random error and burst error correction system.

Another object of the invention is to provide a random and burst error correction system that has reached the maximum theoretical limit of correction for convolutional codes.

More specifically, it is an object of this invention to provide an error correction system that can correct one random error out of every four bits transmitted and a burst of errors having a length B bits long, where B is any positive integer, provided that the burst is followed by at least 3B correct bits.

Another object of this invention is to provide an error correcting system capable of correcting burst errors having any arbitrary lengths B.

In accordance with a preferred embodiment of the invention, an encoder comprises an information register having B + 1 stages and a parity bit register having 2B + 1 stages. Information bits to be encoded are applied to the information bit register, and the contents of the first and last stages of the information bit register are combined in a modulo 2 adder, and the modulo 2 sum thereof is applied to the input of the parity bit register. The contents of the first stage of the information bit register and the contents of the last stage of the parity bit register are alternately applied to the transmission channel. The decoder comprises an information bit register having at least B + 1 stages, and a syndrome bit register havinb B + 1 stages. Syndrome bits are generated by combining the contents of the first and last stages of the information bit register and a parity bit in a modulo 2 adder. The resultant syndrome bits are applied to the syndrome register, and the sum of the contents of the first and last stages of the syndrome register is computed. If the sum thus computed exceeds one, a correction signal is generated to correct the bit present in the last stage of the information bit register.

DESCRIPTION OF THE DRAWINGS

In the drawings:

FIG. 3 is a simplified block diagram of an encoder according to the invention for correcting errors having a burst length of one bit, and is shown to illustrate the operation of the system;

FIG. 4 is a decoder for errors having a burst length of one bit for use in conjunction with the encoder of FIG. 3;

FIG. 5 is a table of equations illustrating the operation of the encoder of FIG. 3;

FIG. 6 is a table of equations illustrating the operation of the decoder of FIG. 4; and FIG. 7 is a table of equations showing the general form of the Equations (1)–(4) of FIGS. 5 and 6.

DETAILED DESCRIPTION

Figure 1:
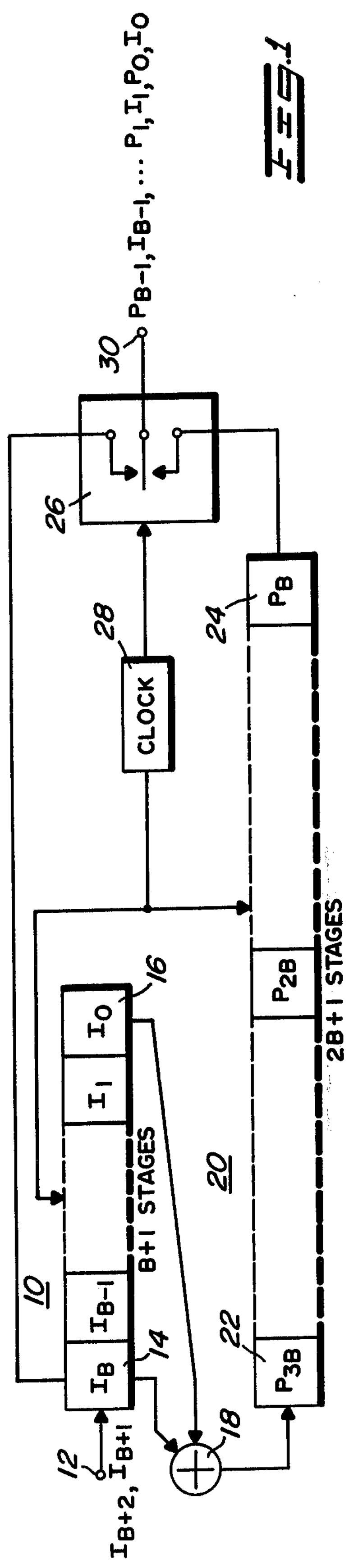
FIG. 1 is a block diagram of one embodiment of the encoder portion of the error correcting system according to the invention.

Referring to FIG. 1, there is shown a block diagram of the encoder for the system according to the invention. An information sample and storage means such as the information shift register 10, which has B + 1 stages and an input 12, has the first and last stages 14 and 16 thereof, respectively, connected to a modulo 2 adding circuit 18. B is defined in this specification as the number of bits in the longest burst errors to be corrected by the system. The output of the modulo 2 adding circuit 18 is connected to the input of a parity bit sample and storage means such as the shift register 20 having 2B + 1 stages. The output of the last stage 24 of the parity bit shift register 20 and an output of the first stage 14 of the information shift register 10 are connected to a switching circuit, such as a switch 26 in this embodiment. A clock 28 is connected to the information shift register 10, the parity bit shift register 20 and the switch 26.

In operation, the information bits to be encoded according to the coding scheme of the system according to the invention are applied to the input point 12 of the shift register 10. The information bits are applied sequentially to the input point 12, and each time a new bit is applied to the point 12, the bits present in the shift register 10 are sequentially shifted to a subsequent stage until all of the B + 1 stages contain information bits. The shifting of information bits through the register 10 is accomplished under the control of pulses from the clock 28. The contents of the first and last stages 14 and 16, respectively, of the shift register 10 are sampled, and the modulo 2 sum thereof is generated by the modulo 2 adding circuit 18. A modulo 2 sum is defined as a non-carrying addition wherein the modulo 2 sum of two zeros or two ones is zero, whereas the modulo 2 sum of a one and a zero is a one. The modulo 2 sum of the contents of the stages 14 and 16 is taken after each shift of the information in the shift register 10, and the resultant sums are applied to the 2B + 1 stage parity bit register 20. The parity bits applied to the parity bit shift register 20 are shifted through the shift register 20 in synchronism with the shifting of the bits present in the shift register 10 under the control of the clock 28. The length of the parity bit shift register is longer than the length of the information bit shift register to delay the transmission of each parity bit with respect to the transmission of the information bits used to generate the parity bit. The clock 28 provides signals to the switch 26 at twice the shift rate of the shift registers 10 and 20 to cause the switch 26 to alternately couple, after each shift, the first stage 14 of the shift register 10 and the last stage 24 of the shift register 20 to an output point 30, which may be connected to an appropriate transmission channel (not shown).

Figure 2:
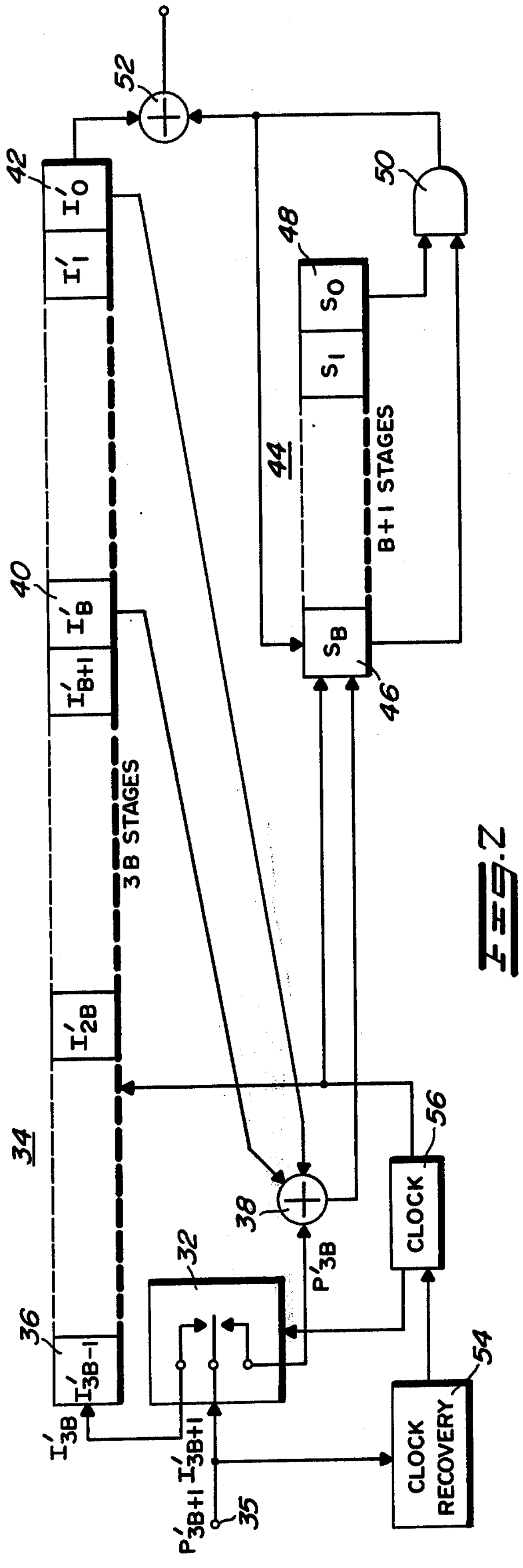
FIG. 2 is a block diagram of a decoder to be used in conjunction with the encoder of FIG. 1.

Referring to FIG. 2, there is shown a block diagram of a decoder for decoding the types of signals produced by the circuit of FIG. 1. A switch 32 has an input thereof connected to an input point 35. The input point 35 may be coupled to the output point 30 of the circuit of FIG. 1 via a telephone line, radio link or other appropriate transmission channel. An output of the switch 32 is connected to the input of an information bit register 34 which has 3B stages. As in the case of the circuit of FIG. 1, B represents the number of bits present in the longest burst of errors to be corrected. Another output of the switch 32 is connected to an input of a modulo 2 adding circuit 38, which has other inputs thereof connected to the last stage 42 of the shift register 34 and an intermediate stage 40 which is offset from the last stage 42 by the same number of stages (B bits in this embodiment) as separates the first and last stages of the information shift register 10 of FIG. 1. An output of the modulo 2 adder 38 is connected to an input of a B + 1 stage syndrome bit sample and storage means such as a syndrome bit shift register 44 which has a first stage 46 and a last stage 48 each connected to respective inputs of correction signal generating means which may include a summing or adder circuit, or a gate such as an AND gate 50. The output of the AND gate 50 and the output of the last stage 42 of the shift register 34 are each connected to inputs of a modulo 2 adder 52, which serves as an error correcting means for bits emerging from the shift register 34. The output of the AND gate 50 is also connected to an input of the first stage 46 of the syndrome register 44. A clock recovery circuit 54 has an input connected to the input point 35 and an output connected to the input of a clock 56. Outputs of the clock 56 are connected to the switch 32, the information bit shift register 34 and the syndrome bit shift register 44 for control thereof.

In operation, signals such as those generated by the circuit of FIG. 1 are received from the transmission link and applied to the input point 35. The signals are received by the clock recovery circuit 54 which causes the clock 56 to provide pulses in synchronism with the received information bits to the switch 32. The pulses from the clock 56 cause the switch 32 to alternately connect the input point 34 to the first stage 36 of the information shift register 34 and the modulo 2 adder circuit 38. The switching action is synchronized such that the information bits are applied to the information register 34 and the parity bits are applied to the modulo 2 adder 38. Each received information bit is applied to the first stage 36 of the informationn bit register 34, and the previous bit stored in the first stage 36 is shifted to a subsequent stage under the control of pulses from the clock 56 until each received information bit is shifted from the first stage 36, through intermediate stages to the last stage 42. The contents of the last stage 42 and the intermediate stage 40 of the shift register 34 are sampled, and the modulo 2 sum of the contents of the stages 40 and 42 and the currently received parity bit is calculated and applied to the first stage 46 of the syndrome shift register 44.

The first and last stages 46 and 48, respectively, of the B + 1 bit syndrome register 44 are sampled to determine whether a transmission error has occurred. For reasons which will be described in greater detail in a subsequent portion of the specification, the presence of a one in both stages 46 and 48 of the register 44 indicates that a transmission error has occurred during the transmission of the bit presently stored in the stage 42 of the shift register 34. If neither or only one of the stages 46 and 48 contains a one, then the bit stored in the stage 42 is assumed to be correct and no corrective action is taken.

The correction of erroneous bits is provided by the AND gate 50 and the modulo 2 adder 52. When a one is present in both stages 46 and 48, the output of the AND gate 50 is a one which is applied to the modulo 2 adder 52. When a one is provided by the AND gate 50, the one from the AND gate 50 and the bit from the stage 42 are combined in the modulo 2 adder 52 in order to correct the erroneous bit. The one from the AND gate 50 is also applied to the first stage 46 to change the polarity of the bit stored therein because an incorrect bit in the stage 42 results in an incorrect syndrome bit in the stage 46. If neither or only one of the stages 46 and 48 contains a one, the output of the AND gate 50 is a zero, and the information bit emerging from the stage 42 passes through the modulo 2 adder 52 unchanged, and no change is made to the syndrome bits stored in the stage 46.

In order to better understand the operation of the system, a simple system for correcting one bit errors (B = 1) will be described with reference to FIGS. 3 and 4 and the equations shown in FIGS. 5 and 6. Referring to FIG. 3, the encoder contains an information bit register 110 having two stages (B + 1 stages with B = 1) 114 and 116. The system also contains a three stage (2B + 1 stages with B = 1) parity bit shift register 120. The stages 114 and 116 of the shift register 110 are connected to inputs of a modulo 2 adder 118 which has an output connected to a stage 122 of the shift register 120. A switch 126, analogous to switch 26 of FIG. 1, is connected to the stage 114 of the shift register 110 and to a stage 124 of the shift register 120. An output 130 of the switch 126 is connected to the transmission medium.

FIG. 4 shows a partial block diagram of a decoder for decoding bursts having a burst length B = 1. The diagram of FIG. 4 shows a three stage information bit register 134 having three stages (3B stages with B = 1) and a two stage syndrome bit register (B + 1 stage with B = 1). Stages 140 and 142 of the information shift register 134 are connected to an input of a modulo 2 adder which has another input for receiving transmitted parity bits and an output connected to a stage 146 of the syndrome shift register 144. An AND gate 150 has inputs thereof connected to the stages 146 and 148 of the syndrome register 144, and an output connected to the stage 146 and to a modulo 2 adder 152, which has another input connected to the stage 142 of shift register 140. The clocks and clock recovery circuits and some of the switching circuits shown in FIGS. 1 and 2 have been omitted in FIGS. 3 and 4 for reasons for simplicity, however, it should be understood that such circuits are necessary for the operation of the system and would therefore normally be included.

The equations shown in FIG. 5 indicate how the parity bits are generated by the system of FIG. 3. Equations (1) and (2) of FIG. 5 show how representative parity bits $P_4$ and $P_5$ are generated, $P_4$ being equal to the modulo 2 sum of the information bits $I_1$ and $I_2$, and the parity bit $P_5$ being equal to the modulo 2 sum of the information bits $I_2$ and $I_3$. Other parity bits are generated in a similar fashion, for example, $P_6$ being equal to the modulo 2 sum of $I_3$ and $I_4$, etc.

The equations (3) and (4) of FIG. 6 indicate how the syndrome bits are generated by the decoder system of FIG. 4. For example, the syndrome bit $S_1$ is equal to the modulo 2 sum of the received information bits $I'_1$ and $I'_2$ stored in the stages 140 and 142 of the information bit register 134 and the currently received parity bit $P'_4$. The primes indicate received bits, and in the absence of transmission errors, each primed or received bit should be equal to the corresponding unprimed or transmitted bit. Similarly, equation (4) indicates that the syndrome bit $S_2$ is equal to the modulo 2 sum of the bits $I'_2$, $I'_3$ and $P'_5$.

If there have been no transmission errors, and the received information and parity bits are the same as the corresponding transmitted bits, then the value of the parity bits $P_4$ and $P_5$ shown in equations (1) and (2) may be substituted into the equations (3) and (4) to generate the equations (5) and (6) of FIG. 6, respectively. Again, if we assume that there have been no transmission errors in any of the information bits, the received information bits, denoted by primes, and the corresponding transmitted information bits are equal to each other, thereby making $S_1$ and $S_2$ equal to zero since the modulo 2 sum of each received information bit and its corresponding transmitted bit is equal to zero. If any one of the received information bits $I'_1$ and $I'_2$ or the received parity bit $P'_4$ contains an error, then the syndrome bit $S_1$ will have a value of 1. Similarly, if any one of the received bits $I'_2$, $I'_3$ or $P'_5$ contains an error, then the value of the syndrome bit $S_2$ will be equal to 1. Since $I'_2$ is the only term that appears in both of the equations (3) and (4), and if only $I'_2$ is in error, then both of the syndrome bits $S_1$ and $S_2$ will have a value of 1. If any one of the other received bits is in error, then only one of the syndrome bits $S_1$ and $S_2$ will have a value of 1 because each of the other terms $I'_1$, $I'_3$, $P'_4$ and $P'_5$ appears only once in the equations (3) and (4). Hence, each received information bit will only be corrected when both $S_1$ and $S_2$ have a value equal to 1.

Referring to FIG. 4, it can be seen that when both $S_1$ and $S_2$ have a value equal to 1, then a one is applied by the AND gate 150 to the modulo 2 adder 152 to correct the received information bit $I'_2$ emerging from the stage 142 of the information shift register 134. Since the value of the syndrome bit $S_2$ in stage 146 of register 144 was affected by the error in the information bit $I'_2$, the value of the syndrome bit $S_2$ is also changed prior to the shifting of the syndrome $S_2$ from the stage 146 to the stage 148 to avoid an improper correction of the next received information bit $I'_3$ during the next correction sequence.

The analysis described in the foregoing also applies to systems such as those shown in FIGS. 1 and 2 wherein the length of the burst of errors is any arbitrary length B bits long. In such a system, the encoder equations would be generated by taking the modulo 2 sum of the bits stored in the stages of the information bit shift register, such as the shift register 10, that are connected to the modulo 2 adder, such as the modulo 2 adder 18. The decoder equations would be generated by taking the modulo 2 sum of the information bits stored in the register 34 which are connected to the modulo 2 adder 38 and the currently received parity bit from the switch 32. The equations would be analogous to those shown in FIGS. 5 and 6 except that the modulo 2 sums would be generated by taking the sums of information bits that are offset by B bits rather than one bit ($B = 1$) as shown in FIGS. 5 and 6.

The general equations are shown in FIG. 7. In the equations of FIG. 7, the equations (7)–(10) are analogous to the respective Equations (1)–(4) of FIGS. 5 and 6. B represents the number of bits in the longest burst to be corrected, and $j$ may be any integer such as 0, 1, 2 3, etc. The same principles apply to all systems according to the invention regardless of the length of the maximum error burst length B, and the system may be tailored to accommodate any length of burst by simply adjusting the length of the information bit, syndrome bit and parity bit shift registers accordingly.

Whereas a particular embodiment of the system according to the invention has been described in the foregoing specification, it should be noted that any modifications made by those skilled in the art still fall within the scope and spirit of the invention.

I claim:

1. An error correcting system for correcting bursts of errors in a bit stream having an arbitrary burst length up to B bits long, said error correcting system having an encoder for generating parity bits from information bits applied thereto and applying said information bits and said parity bits to utilization means, said encoder comprising:

information bit sample and storage means having $B + 1$ stages for receiving and storing $B + 1$ successive information bits;

parity bit generating means connected to the first and last of said $B + 1$ stages of said information bit sample and storage means, said parity bit generating means including modulo 2 adder means for taking the modulo 2 sum of the information bits stored in said first and last stages of said information bit sample and storage means to thereby generate a parity bit at an output thereof associated with the information bits stored in said first and last stages of said information bit sample and storage means;

parity bit sample and storage means having $2B + 1$ stages for receiving and storing $2B + 1$ successive parity bits, and and input and an output, said input of said parity bit sample and storage means being coupled to said output of said modulo 2 adder means;

switch means connected to said information bit sample and storage means and the output of said parity bit sample and storage means for alternately transferring information and parity bits respectively therefrom to said utilization means; and clock means connected to said information bit sample and storage means and said parity bit sample and storage means for successively shifting said information bits and said parity bits between successive stages of said information bit sample and storage means and said parity bit sample and storage means, respectively, said clock means being further connected to said switch means, said switch means being responsive to said clock means for applying one information bit and one parity bit to said utilization means between each shift of information in said information bit and said parity bit sample and storage means.

2. An error correcting system as recited in claim 1 wherein said switch means is connected to the first stage of said B + 1 stages of said information bit sample and storage means and to the output of said parity bit sample and stage means, said last mentioned output being connected to the last stage of said parity bit sample and storage means.

3. An error correcting system as recited in claim 1 further including a decoder comprising:

means for receiving said information bits and said parity bits;

second information bit sample and storage means having at least B + 1 stages for storing at least B + 1 received information bits having an input coupled to said receiving means, and an output;

syndrome bit generating means having inputs and an output, said inputs being connected to the last stage of said B + 1 stages of said second information bit sample and storage means, to the one of said last mentioned B + 1 stages precedent said last mentioned last stage by B stages, and to said receiving means, said syndrome bit generating means including second modulo 2 adder means for taking the modulo 2 sum of the received information bits stored in the stages connected to said syndrome bit generating means and a received parity bit associated therewith to thereby generate a syndrome bit associated with said last mentioned stored information bits and the parity bit associated therewith at said output;

syndrome bit sample and storage means having B + 1 stages for storing B + 1 syndrome bits, said syndrome bit sample and storage means having a first stage thereof coupled to the output of said second modulo 2 adder means and a last stage;

correction signal generating means having inputs connected to the first and last stages of said B + 1 stages of said syndrome bit sample and storage means, and an output, said correction signal generating means being responsive to the syndrome bits stored in the stages connected thereto for providing a correction signal at the output thereof only when both of said stored syndrome bits have the same predetermined value; and correcting means connected to the output of said second information bit sample and storage means and the output of said correction signal generating means for correcting information bits present at the output of said second information bit sample and storage means in response to the correction signal from said correction signal generating means.

4. An error correcting system as recited in claim 3 further including delay means connected to said receiving means and said second information bit sample and storage means for delaying the received information bits applied to said second information bit sample and storage means.

5. An error correcting system as recited in claim 4 wherein said delay means includes delay sample and storage means having 2B − 1 stages.

6. An error correcting system as recited in claim 3 wherein said second information bit sample and storage means includes 3B stages for storing 3B received information bits.

7. An error correcting system as recited in claim 6 further including second clock means connected to said second information bit sample and storage means and said syndrome bit sample and storage means for successively shifting said received information bits and said syndrome bits between successive stages of said second information bit sample and storage means and said syndrome bit sample and storage means, respectively.

8. In an error correcting system for correcting bursts of errors in a bit stream having an arbitrary burst length up to B bits long, an encoder for generating parity bits from information bits applied thereto comprising:

information bit sample and storage means having B + 1 stages for serially receiving and storing said information bits, said information bit sample and storage means having a first stage and a last stage;

means connected to said first stage of said information bit sample and storage means for applying each information bit thereto for storage therein;

clock means connected to said information bit sample and storage means for sequentially shifting each information bit through said B + 1 stages from said first stage to said last stage thereof;

modulo 2 adder means connected to the first and last stages of said information bit sample and storage means for taking the modulo 2 sum of the information bits stored therein to thereby generate a parity bit in response to each pair of information bits stored in the first and last stages of said information bit sample and storage means;

parity bit sample and storage means having 2B + 1 stages for serially receiving and storing said parity bits, said parity bit sample and storage means having a first stage connected to said modulo 2 adder means and a last stage, said parity bit sample and storage means being further coupled to said clock means and responsive thereto for sequentially shifting each parity bit through said 2B + 1 stages from said first stage to said last stage thereof; and switch means having first and second input terminals and an output terminal, said first input terminal being connected to the first stage of said information bit sample and storage means and said second terminal being connected to the last stage of said parity bit sample and storage means, said switch means being further coupled to said clock means and responsive thereto for alternately coupling said first stage of said information bit sample and storage means and said last stage of said parity bit sample and storage means to said output terminal.

9. In an error correcting system as recited in claim 8, said information bit sample and storage means and said parity bit sample and storage means each include a shift register having B + 1 stages and 2B + 1 stages, respectively.

10. In an error correcting system for correcting bursts of errors having an arbitrary burst length up to B bits long, a decoder for extracting and correcting information bits from a bit stream having information and parity bits, said decoder comprising:

means for receiving said information bits and said parity bits;

information bit sample and storage means having at least B + 1 stages, said information bit sample and storage means having a first stage coupled to said receiving means for receiving said information bits and a last stage;

syndrome bit generating means having inputs and an output, said inputs being connected to the last stage of said information bit sample and storage means, to one of said B + 1 stages precedent said last stage by B stages and to said receiving means, said syndrome bit generating means including modulo 2 adder means for taking the modulo 2 sum of the received information bits stored in the stages connected to said syndrome bit generating means and a received parity bit associated therewith to thereby generate a syndrome bit in response to each received parity bit and the stored information bits associated therewith at said output;

syndrome bit sample and storage means having B + 1 stages, said syndrome bit sample and storage means having a first stage connected to the output of said syndrome bit generating means for receiving said syndrome bits and a last stage;

correction signal generating means having inputs connected to said last stage of syndrome bit sample and storage means and to the one of said last mentioned B + 1 stages precedent said last mentioned last stage by B stages, said correction signal generating means being responsive to the syndrome bits stored in the stages connected thereto for providing a correction signal at the output thereof only when both of said stored syndrome bits have the same predetermined value;

correcting means connected to the last stage of said information bit sample and storage means and the output of said correction signal generating means for correcting information bits received from said information bit sample and storage means in response to the correction signal from said correction signal generating means; and clock means connected to said information bit sample and storage means and said syndrome bit sample and storage means for sequentially shifting each of said information bits and said syndrome bits, respectively, through each of said respective sample and storage means from said respective first stage to said respective last stage thereof.

11. In an error correcting system as recited in claim 10 wherein said information bit sample and storage means has 3B stages.

12. In an error correcting system as recited in claim 11 wherein each of said information bit sample and storage means and said syndrome bit sample and storage means includes a shift register.

13. In an error correcting system as recited in claim 12 wherein said correction signal generating means includes an AND gate.

14. In an error correcting system as recited in claim 13 wherein said correcting means includes a modulo 2 adder.

15. In an error correcting system as recited in claim 10 wherein the output of said correction signal generating means is further coupled to the first stage of said syndrome bit sample and storage means, said syndrome bit sample and storage means being responsive to said correction signal to change the value of the syndrome bit stored in said last mentioned stage.

* * * * *